J. C. BARBER.
CAR TRUCK.
APPLICATION FILED MAY 6, 1915.
1,190,703.
Patented July 11, 1916.
3 SHEETS—SHEET 3.
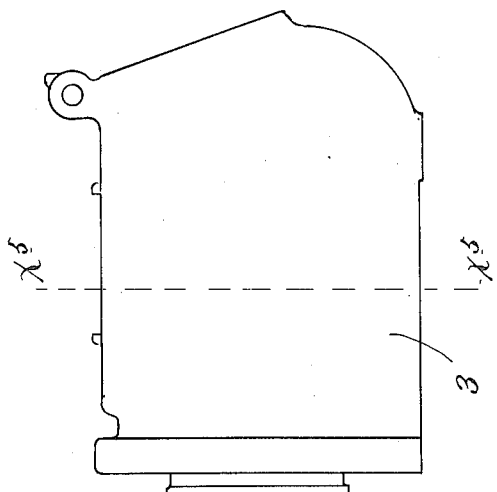
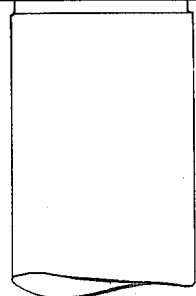
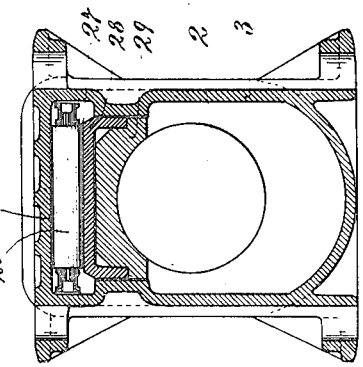
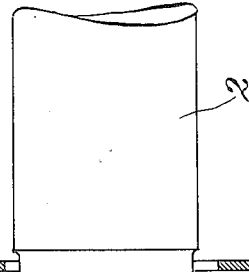
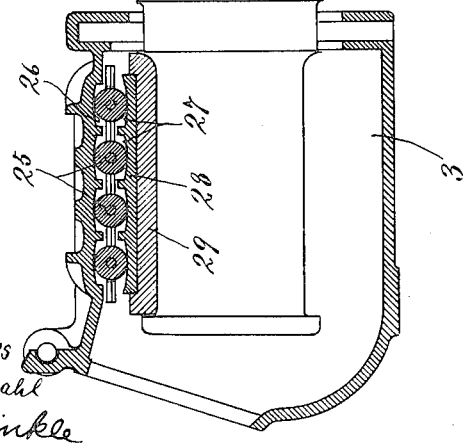
Fig. 4.
Fig. 5.
Witnesses
A. H. Opsahl
E. C. Skinkle
Inventor
John C. Barber.
By his Attorneys
William Merchant

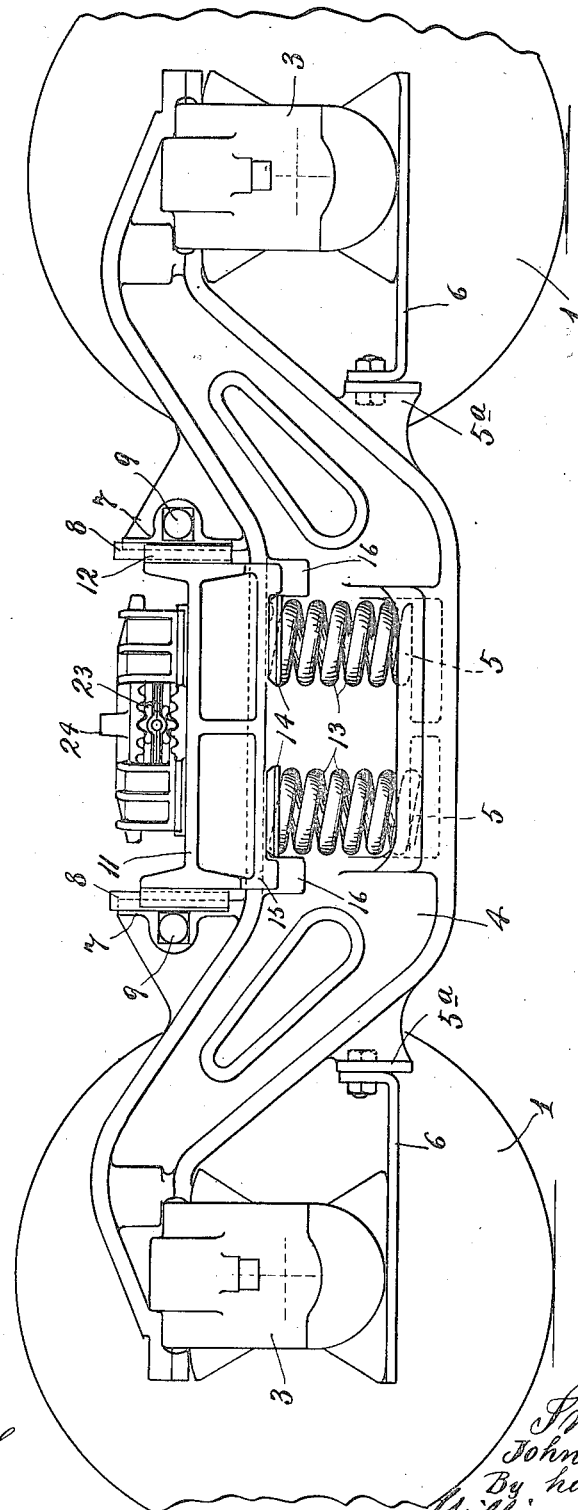

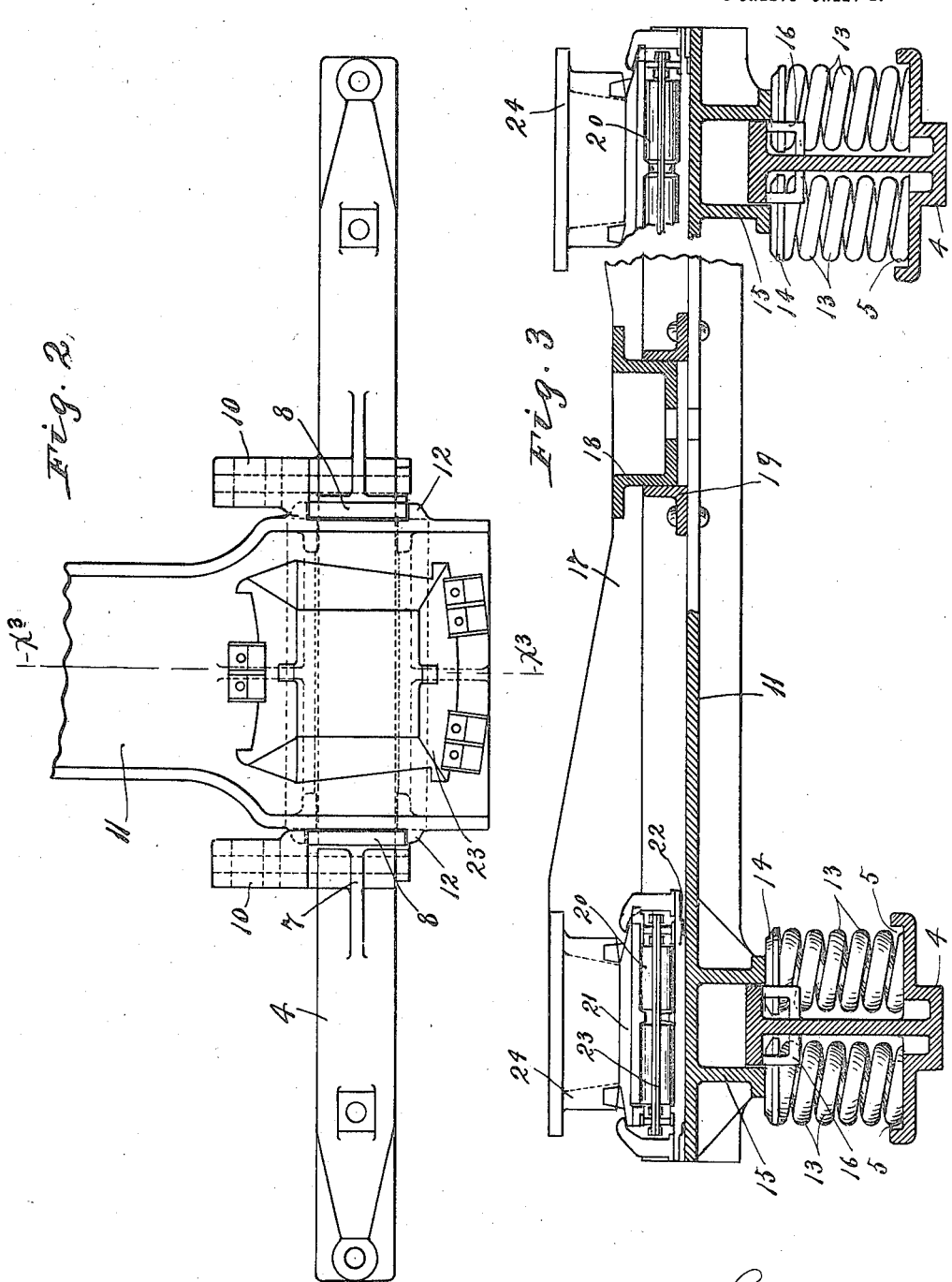

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CAR-TRUCK.

1,190,703.  Specification of Letters Patent.  Patented July 11, 1916.

Application filed May 6, 1915. Serial No. 26,317.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My present invention relates to car trucks and has for its object to improve the same in the several particulars hereinafter noted.

Generally stated, the invention consists of the novel devices and combinations of devices hereinafter described and defined in the claims.

In accordance with the present invention, the truck side frames are cross connected (aside from the connection between the journal boxes and axles), only by a truck bolster, and this truck bolster is so connected to the truck side frames that it is capable of vertical movements, and throughout such vertical movements, remains interlocked with the truck side frames. The side bearings, for permitting radial motion, are applied on the truck bolster. When lateral motion of the truck body in respect to the truck wheels is desired, lateral motion roller bearing devices may be interposed between the truck side frames and the journals.

In the accompanying drawings which illustrate the invention, like characters indicate like parts throughout the several views.

Referring to the drawings: Figure 1 is a side elevation with some parts broken away, showing a car truck embodying my invention; Fig. 2 is a plan view showing one of the truck side frames and a portion of the truck bolster; Fig. 3 is a section taken approximately on the line $x^3$ $x^3$ on Fig. 2; Fig. 4 is a view partly in vertical section and partly in elevation, showing one of the axles and the coöperating journal boxes, some parts being broken away; and Fig. 5 is a section taken on the line $x^5$ $x^5$ on Fig. 4.

The truck wheels are indicated by the numeral 1, and the axles by the numeral 2. The journal boxes are indicated by the numeral 3.

The truck side frames 4 are of the cast steel girder type, the ends of which are seated on the tops of the journal boxes. As shown, these side frames have lugs $5^a$, to which and the bottoms of the journal boxes, journal box tie straps 6 are secured. The side frames 4 have central webs and are provided with marginal flanges projecting both on the inner and outer sides thereof. The projecting flanges at the bottom of the tension portions of the said side frames are expanded and constructed to afford bracket-like spring seats or pockets 5 that afford seats for springs located both inside and outside of the webs of the said side frames. The number of springs employed may be varied, but as shown, there are two springs on each side of the web of each side frame. To afford vertical guides or columns for the truck bolster, the side frames 4 are provided with heavy upwardly projecting guide lugs or columns 7, the opposing faces and the inner and outer edges of which are vertical. Angular chafing plates 8 are secured on the opposing faces of said lugs 7, as shown, by means of bolts 9. These chafing plates 8 are preferably provided with inwardly-projected hubs 10 that afford brake hangers.

The truck bolster 11, as shown, is a cast steel structure widened at its ends so that it fits quite closely between the chafing plates 8, and provided with laterally spaced vertical guide ribs or shoulders 12 that embrace the inner and outer edges of the said chafing plates and thus hold the said bolster against endwise movements transversely of the truck frames, but free for vertical movements in respect to the said truck frames. The said truck bolster is supported on springs 13 seated in the pockets or the brackets 5, as indicated, two inside and two outside of the central web of each side frame. Spring caps 14 are applied to the upper ends of the springs 13, and the truck bolster, at its ends, is provided with a depending parallel guide flange 15 that embraces the top or compression portions of the side frames, and thus coöperates with shoulders 12 to hold the truck bolster against endwise movements transversely of the truck frame, but free for vertical movements in respect thereto. The upper central portions of the side frames 4 are further preferably provided with wearing lugs 16 cast integral therewith, for engagement with the opposing surfaces of the bolster guiding flanges 15. The lower edges of the bolster flanges 15 rest upon the spring caps 14.

In Fig. 3, the body bolster of the car is indicated diagrammatically by the numeral 17, and the same is shown as provided at its central portion with a hub 18 that telescopes into a center bearing flange 19 on the central portion of the truck bolster 11. These elements 18 and 19 afford a pivot between the body and truck bolsters but do not transmit the weight of the load from the former to the latter. The weight of the load is preferably transmitted from the said body bolster to the truck bolster through roller side bearing devices interposed between the outer end portions of said bolsters directly over the truck side frames. These roller side bearings in the construction illustrated, comprise rollers 20, upper and lower roller bearing plates 21 and 22, a roller cage 23 and bearing blocks 24.

The construction so far specifically described would make up a truck with no provision for lateral motion of the truck body in respect to the wheels. When this lateral motion is desired, it is preferably accomplished by interposing lateral motion rollers 25 between self-centering seats 26, shown as formed on the under surface of the top plate of the journal boxes, and similar cooperating seats 27 shown as formed on bearing plates 28 seated on the bearing brasses 29, all as shown in Figs. 4 and 5.

In the truck construction, as above described, I obtain a strong, simple and compact arrangement with high or long truck springs well balanced on each side of the center of journals, and furthermore, eliminate all cross ties except the truck bolster itself. Moreover, I obtain a truck which carries its load low down and, at the same time, has exceedingly high track clearance between the truck side frames. Both the buffing shocks and lateral shocks are taken directly between the ends of the truck bolster and the truck side frames, and the wearing and buffing surfaces are extended over very considerable areas of both of said members. Such a truck may be constructed at comparatively small cost, and at the same time, made very strong, durable and generally efficient.

What I claim is:

1. In a car truck, the combination with truck side frames having central webs and spring-supporting brackets on the inner and outer sides thereof, of springs seated on said brackets, a truck bolster having depending flanges that embrace upper central portions of said side frames and are mounted on said springs, the said truck bolster being free for vertical movements in respect to said side frames but held against endwise movements transversely of said side frames and held against lateral movements longitudinally of said side frames.

2. In a car truck, the combination with cast side frames having central webs, spring-supporting brackets projecting inward and outward from the lower central portions of said webs and having longitudinally spaced vertical bolster guide lugs on its upper portion, of springs mounted on said brackets, and a truck bolster working between said bolster guide lugs and having depending flanges supported on said springs, the said truck bolster being thereby mounted for vertical movements only in respect to said side frames.

3. In a car truck, the combination with cast side frames having central webs, spring-supporting brackets projecting inward and outward from the lower central portions of said webs and having longitudinally spaced vertical bolster guide lugs on its upper portion, of springs mounted on said brackets, and a truck bolster working between said bolster guide lugs and having depending flanges supported on said springs, the said truck bolster being thereby mounted for vertical movements only in respect to said side frames, and constituting the only cross tie between the central portions of said side frames.

4. In a car truck, the combination with truck wheels, axles, journal boxes and truck side frames, of a truck bolster having its ends extended over the truck side frames, depending elements on the truck bolster interlocking said truck bolster to the truck side frames against endwise and lateral movements but with freedom for vertical movement, said truck bolster constituting the sole connection between the central portions of said truck side frames, and anti-friction lateral motion devices interposed between said truck side frames and the axle journals.

5. In a car truck, the combination with wheels, axles, journal boxes and truck side frames, of a truck bolster having its ends extended over the truck side frames and spring-supported on said truck side frames, depending elements on the truck bolster interlocking said truck bolster to the truck side frames against endwise and lateral movements but with freedom for vertical movement, and anti-friction lateral motion devices interposed between said side frames and the axle journals.

6. In a car truck, the combination with truck side frames, of a truck bolster spring-supported on said side frames with freedom for vertical movements but interlocked thereto against endwise and lateral movements, said bolster having depending flanges embracing the upper portions of said side frames and bearing on said springs, and radial motion devices applied on the ends of said bolster directly above said side frames.

In testimony whereof I affix my signature in presence of two witnesses.

JOHN C. BARBER.

Witnesses:
E. W. WEBB,
F. L. BARBER.